No. 772,094. Patented October 11, 1904.

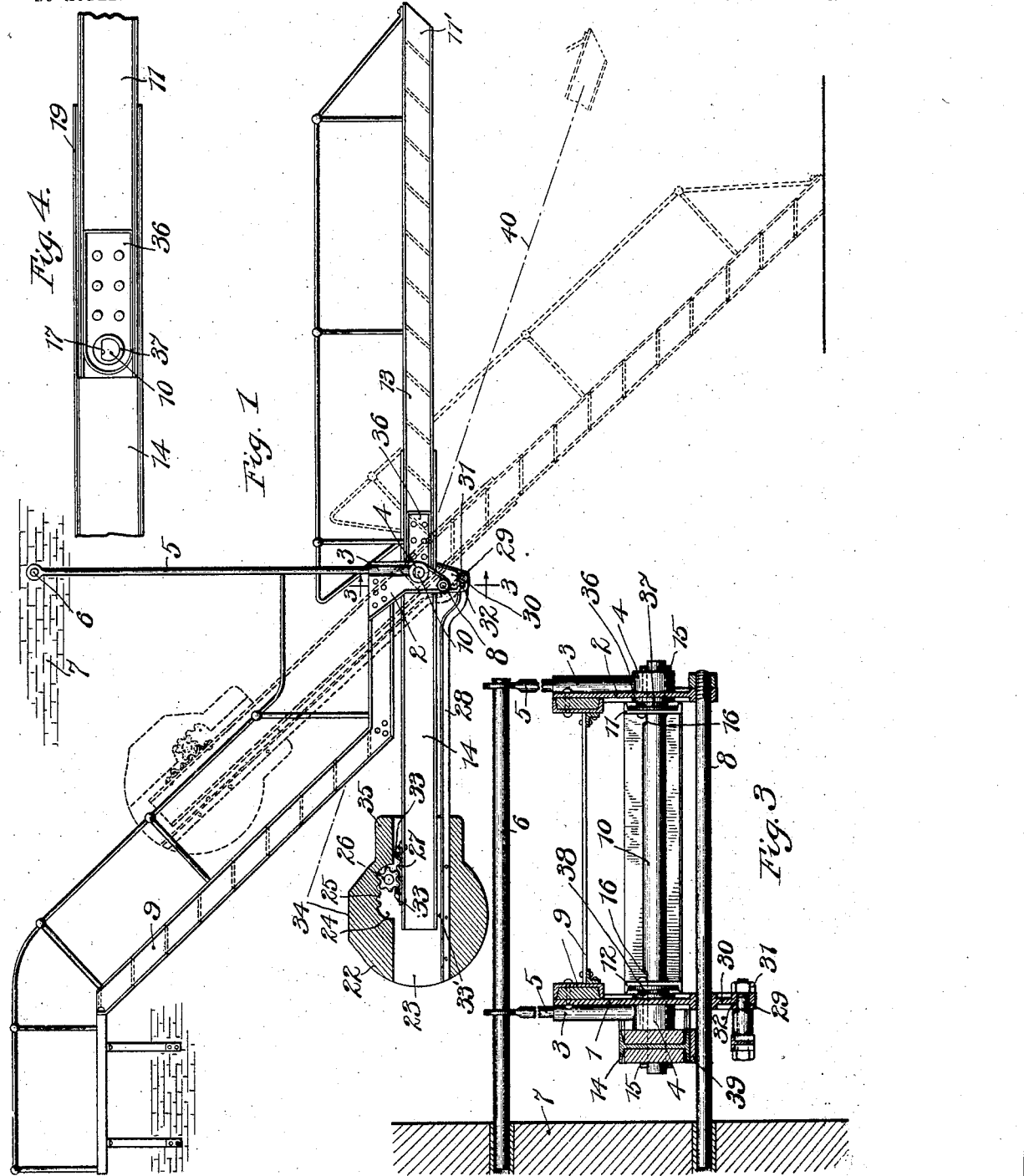

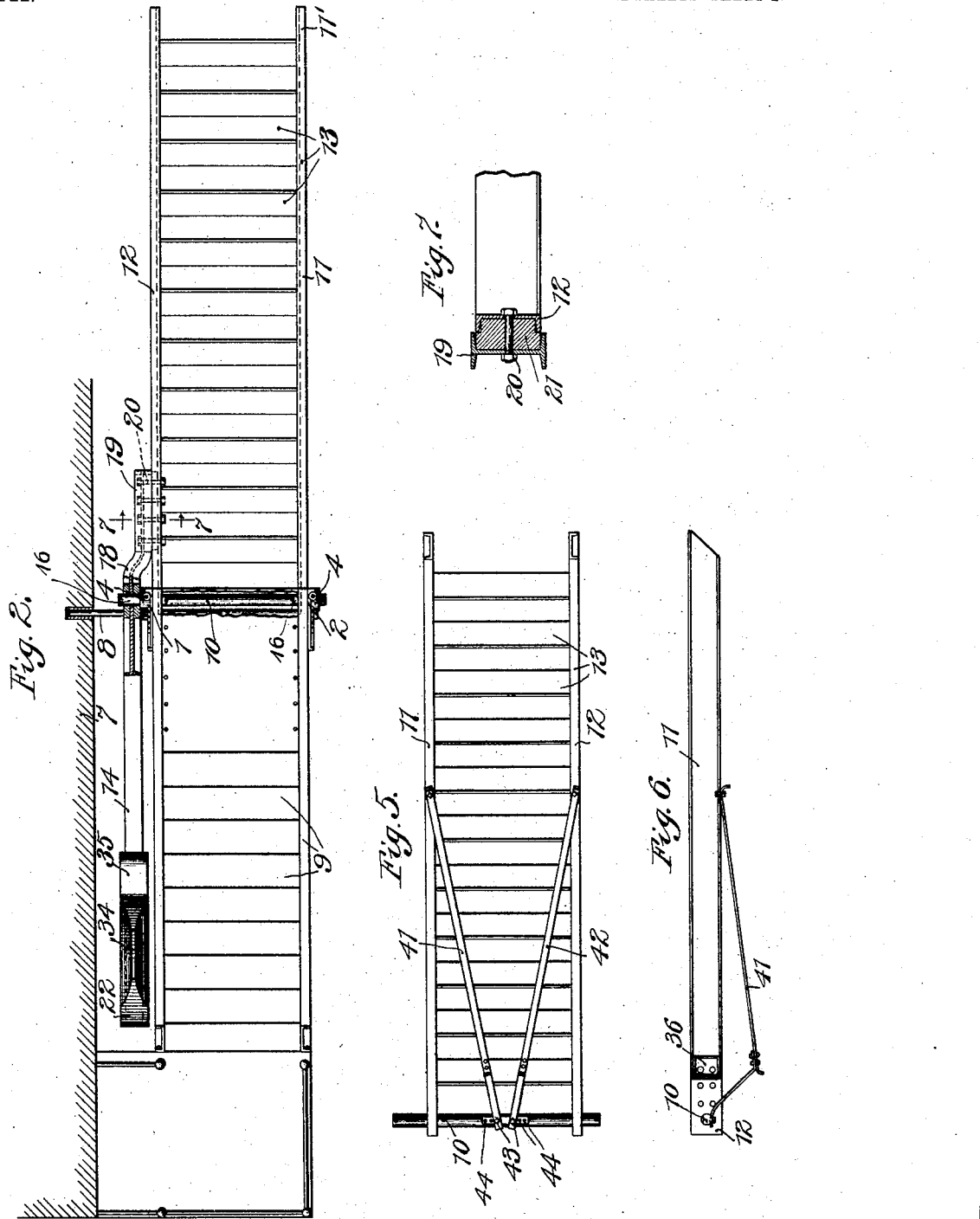

UNITED STATES PATENT OFFICE.

OTTO C. FOSSELMAN, OF CHICAGO, ILLINOIS.

COUNTERBALANCED STAIRWAY OR LADDER.

SPECIFICATION forming part of Letters Patent No. 772,094, dated October 11, 1904.

Application filed April 15, 1904. Serial No. 203,271. (No model.)

*To all whom it may concern:*

Be it known that I, OTTO C. FOSSELMAN, a citizen of the United States, residing at Chicago, in the county of Cook and State of Illinois, have invented a certain new and useful Improvement in Counterbalanced Stairways or Ladders, (Case No. 1,) of which the following is a full, clear, concise, and exact description, reference being had to the accompanying drawings, forming a part of this specification.

My invention relates to counterbalanced stairs or ladders, and particularly to stairs or ladders used in connection with fire-escapes.

The general object of my invention is to provide more positive, more reliable, and more efficient means for operating a stairway, and the main features are improved means for operating the counterweight and improved means for preventing distortion or sagging of the parts of the structure due to the unbalanced strains.

Although movable counterweights are well known in the art, they are not positively actuated, but depend upon gravity for their operation. Spherical weights have been employed which when the stairway or ladder is moved are caused to roll to shift the center of gravity of the structure. Swinging weights have also been employed to operate in the same manner. Such weights, however, are apt to oscillate after being started, thereby causing the stairway to move in a jerky manner. Again, the spherical weight when started moves very suddenly to its other position, thereby causing the stairway or ladder to be suddenly instead of gradually raised or lowered, this being very dangerous should any person be standing in the path of the stairway. To overcome these defects, I provide means for actuating the weight positively by mechanism connecting the weight with the movable structure, thus eliminating the jerky motion of the structure and insuring gradual motion thereof. I provide a weight adapted to travel longitudinally along the end of the counterbalanced arm, and a rod which is secured to the weight extends forwardly and engages a stationary pivot-point disposed below the main pivot, about which the structure is adapted to oscillate. Thus normally the center of gravity of the structure is on the weight side of the main pivot, and upon descent of the stairway the weight is pulled toward the pivot by the rod to shift the center of gravity of the structure to the other side of the main pivot, thus to maintain the stairway in its descended position. Upon a slight upward impetus the weight is moved away from the main pivot to again shift the center of gravity to the weight side of the pivot. I so proportion the parts that when the stairway lies in the neutral or balance line the end of the stairway will be about six feet from the ground, which is slightly above the average height of a man, and should the end of the stairway strike anybody no injury will result. In prior structures, also, special attachments and devices were necessary to compensate for distortion or sagging, particularly of the end of the stairway opposite to the weighted side. In my device, however, I employ a pivot-rod both for the purpose of supporting the structure and also for preventing such distortion or sagging of the stairway.

By reference to the accompanying drawings my invention will be better understood.

Figure 1 shows the application of my device to a building. Fig. 2 is a top view thereof. Fig. 3 is an enlarged sectional view taken on line 3 3 of Fig. 1. Fig. 4 is an enlarged view showing connection between the weight-arm and the stair-supports. Fig. 5 is a view showing the arrangement of brace-rods underneath the stairway. Fig. 6 is a side view of Fig. 5, and Fig. 7 is a sectional view taken on line 7 7 of Fig. 2.

Like reference characters refer to like parts in the various figures.

Hanger-frames 1 and 2 are each provided with a socket 3 and the bearing 4. Rods 5 5 are secured in sockets 3 and are suspended from a boom 6, secured in the wall of the building 7, while a boom 8 passes through the lower part of the hangers 1 and 2. The last stationary flight 9 of the fire-escape may by being secured to hangers 1 and 2 be suspended from the rods 5. A main pivot-shaft 10 is adapted to rotate in the bearings 4 4 and passes through the side members 11 and 12 of the stairway 13 and through the counterbalance-arm 14, being held in place by pins 15 15. The members 11 and 12 and the arm 14 are rigid with respect to the shaft 10 and may be either keyed thereto or secured thereto by milling away part of the shaft to leave flat surfaces 16, which engage corresponding flat surfaces 17 in the members 11 and 12 and arm 14. The weight-arm 14 is preferably an I-beam and has an offset 18, the part 19 being secured to the side member 12 of the stairway by means of bolts 20, a filler 21 being disposed between the I-beam and the member 12, which may be a channel-beam. The weight-arm, as a preferred arrangement, is shown disposed at the inside of the structure, although it may be disposed at the outside thereof, or an arm may be provided at both sides. By disposing the weight-arm on the inside, as shown, the weight is more out of the way and the structure has a neater appearance. The weight 22 is provided with an opening 23 for the passage therethrough of the weight-arm 14, and the bearing-chamber 24 is provided with a toothed or fluted roof 25, adapted for engagement with the teeth of a roller 26, which also engages a fluted rail 27, secured to the top and at the end of the weight-arm. A rod 28 is secured to the interior of the weight 22 and extends forwardly and pivots at its forward end about a pivot rod or bolt 29, secured in the end of an extension 30. A nut 31 secures this bolt in any adjusted position in the slot 32. As this stationary pivot 29 is disposed below the main pivot-rod 10, it will be seen that as the stairs are lowered the weight will be pulled toward the pivot 10, and consequently the center of gravity of the structure will pass toward the pivot 10 and forwardly beyond it. Again, when the stairs are raised the weight will be pushed away from the pivot 10 to return the center of gravity to the weight side of the pivot. The bearing-chamber 24 is as long as the full travel of the weight along the arm, and the end teeth 33 of the fluted rail 27 are somewhat higher than the other teeth. This prevents the escape of the weight from the arm 14 should the rod 28 break or become detached, and these teeth also limit the travel of the weight to the distance allowed by the rod 28. The top of the weight is preferably formed into a ridge 34, which prevents it from catching below the stationary stairway 9, and additional metal 35 is also added to the weight to better balance the center of gravity of the weight to prevent undue strains in the rod 28.

With the construction shown the end of the stair member 11 has a tendency to hang lower than the member 12, to which the counterweight is attached. To prevent this, the pivot-shaft 10 is of comparatively large diameter, which enables it to support great weight without undergoing torsion, and this shaft therefore prevents sagging of the end 11' of the member 11. To further strengthen the member 11 and also to provide a better bearing therefor upon the shaft 10, I provide a strengthening-plate 36, which is securely bolted to the member 11 and which is provided with a hub or bearing 37 for engaging the flat part of the shaft 10. A similar strengthening-plate 38 may be provided for the member 12, and the hubs 37 serve also as fillers to prevent the limbs of the channel-beam members 11 and 12 from interfering with the hangers 1 and 2. Thus the stairway members 11 and 12 and the weight-arm 14 form practically an integral and rigid structure with the pivot-shaft 10, the entire structure rotating in the bearings 4. To prevent the stairway from passing beyond the horizontal position when moved upwardly, I interpose a stop-plate 39 between the boom 8 and the under side of the weight-arm.

I adjust the weights of the structure parts so that when the stairway is disposed in the neutral or balance line 40 the end of the stairway will be about six feet from the ground, which is slightly more than the height of an average person, and should the stairway be lowered unawares a person standing thereunder would suffer no injury, owing to the balanced condition of the structure. The structure also moves very gradually and without jerks, owing to the positive mechanical connection of the weights with the structure.

Although the main pivot-shaft 10 maintains alinement of the stair members 11 and 12, there may still be some sagging of the end of the stairway as a whole. To prevent this, I provide brace members 41 42, as shown in Figs. 5 and 6. These brace members may be in the form of pipes or rods and are interposed between the main pivot-rod 10 and the stair members 11 and 12, being preferably secured to the under side of the shaft 10 by means of the bolts 43, and by means of a series of bolt-holes 44 the brace members may be given various degrees of compression to suitably maintain the stair members straight and in alinement. These brace members serve also to prevent lateral swaying of the stairway. I thus provide a very rigid structure having a minimum number of parts which is free from distortion and which moves gradually and evenly at all times, due to my improved positive mechanical operation of the counterweight. As before stated, the weight may be placed at either side of the movable structure or a weight may be used at both sides thereof or a different arrangement may be made, all depending upon the conditions and circumstances. Changes may be also made in the construction of the operative parts without departing from the principle or scope of the invention, and I do not therefore wish to be limited to the precise arrangement and construction of parts herein set forth; but, Having described my invention, I claim as new and desire to secure by Letters Patent—

1. In a counterbalanced stairway structure, the combination with a stairway part, of a weight-arm secured to said stairway part, side members for said stairway part, a pivot-shaft rigidly secured to the ends of the side members of said stairway part and to said weight-arm and adapted to rotate therewith, fixed bearings in which said pivot-shaft may revolve, and a weight at the end of said weight-arm, substantially as described.

2. In a counterbalanced stairway structure, the combination with a main pivot-shaft, of fixed bearings in which said shaft is adapted to revolve, a stairway part having its side members rigidly secured to said pivot-shaft, a counterbalance-arm secured to said stairway part and to said pivot-shaft, a weight at the end of said counterbalance-arm, and positively mechanically operated means for moving said weight along said arm, substantially as described.

3. In a counterbalanced stairway structure, the combination with a stairway part, of a counterbalance-arm extending therefrom, a main pivot-shaft for said structure disposed near the center of gravity thereof and rigidly secured to the structure to rotate therewith, a weight at the end of said counterbalance-arm, and positive mechanical means for moving the weight along said arm to shift the center of gravity of the structure to either side of the main pivot as the stairway is raised or lowered, substantially as described.

4. In a counterbalanced stairway structure, the combination with a stairway part, of a counterbalance-arm extending therefrom, a movable weight at the end of said counterbalance-arm, a main pivot for said structure disposed near the center of gravity thereof, and positive mechanical means for moving said weight to shift the center of gravity of the structure to the stairway side as the stairway is lowered and to move the weight to reshift the center of gravity to the weight side of the main pivot as the stairway is raised.

5. In a counterbalanced stairway structure, the combination with a stairway part, of a counterbalance-arm extending therefrom, a movable weight at the end of said counterbalance-arm, a main pivot for the structure disposed near the center of gravity thereof, and a rod secured to said weight and pivoted at a fixed point below said main pivot, the center of gravity of the structure in its idle position being on the weight side of the main pivot, descent of the stairway causing said weight to be moved to shift the center of gravity to the opposite side of the main pivot, substantially as described.

6. In a counterbalanced stairway structure, the combination with a stairway part, of a counterbalance-arm extending therefrom, a movable weight at the end of said counterbalance-arm, a roller supporting said weight on said arm, a main pivot for said structure, and a rod secured to said weight and pivoted at a fixed point below said main pivot, the center of gravity of the structure in its raised or idle position being slightly to the weight side of the main pivot, descent of the structure causing the weight to be moved along the weight-arm to shift the center of gravity toward the stairway side of the structure, substantially as described.

7. In a counterbalanced stairway structure, the combination with a stairway part, of a counterbalance-arm extending therefrom, a main pivot for said structure, a hollow movable weight into which the end of said counterbalance-arm extends, the center of gravity of the structure in its idle position being at the weight side of the main pivot, and positive mechanical means for moving said weight as the stairway is lowered to shift the center of gravity of the structure toward the opposite side of the main pivot, substantially as described.

8. In a counterbalanced stairway structure, the combination with a stairway part, of a counterbalance-arm extending therefrom, a movable hollow weight about the end of said counterbalance-arm, a roller disposed between the roof of said hollow weight and the top of said counterbalance-arm for supporting said weight, and a rod connecting said weight with a fixed pivot-point disposed below said main pivot, descent of the stairway causing the center of gravity of the structure to shift from the weight side to the stairway side, substantially as described.

9. In a counterbalanced stairway structure, the combination with a stairway part, of a counterbalance-arm extending therefrom, a hollow movable weight about the end of said counterbalance-arm, a fluted rail at the end of said counterbalance-arm, a corresponding fluted roof in said hollow weight, a toothed roller for engaging said fluted surface and for supporting said weight, and a rod connecting said weight with a fixed pivot disposed below said main pivot, descent of the stairway causing the weight to be moved to shift the center of gravity of the structure from the weight side to the stairway side, substantially as described.

10. In a counterbalanced stairway structure, the combination with a stairway part, of a counterbalance-arm extending therefrom, a fluted rail at the end of said counterbalance-arm, a bearing-chamber in the top of said hollow weight, teeth at the top of said chamber, a toothed roller for engaging said teeth and said fluted rail to support said weight, a rod secured to said weight and pivoted at a fixed pivot disposed below said main pivot, rotation of the structure from its idle position to the descended position causing said weight to be moved to shift the center of gravity of the structure from the weight side to the stairway side thereof, and locking means for confining the travel of the weight to a fixed distance, substantially as described.

11. In a counterbalanced stairway structure, the combination with a stairway part, of a counterbalance-arm extending therefrom, a fluted rail at the end of said counterbalance-arm, a bearing-chamber in the top of said hollow weight, teeth at the top of said chamber, a toothed roller for engaging said teeth and said fluted rail to support said weight, and a rod secured to said weight and pivoted at a fixed pivot disposed below said main pivot, rotation of the structure from its idle position to the descended position causing said weight to be moved to shift the center of gravity of the structure from the weight side to the stairway side thereof, the end teeth of the rail being higher than the others and serving with the ends of the bearing-chamber to lock the weight against further travel at the ends of its stroke, substantially as described.

12. In a counterbalanced stairway structure, the combination with a stairway part, of a counterbalance-arm extending therefrom, a main pivot-shaft to which the end of said stairway and said counterbalance-arm are secured, fixed bearings in which said pivot-shaft may revolve, a movable weight at the end of said counterbalance-arm, and a rod secured to said weight and pivoted at its free end to a fixed pivot disposed below the main pivot-shaft, descent of the stairway causing the weight to be moved to shift the center of gravity of the structure from the weight side to the stairway side of the main pivot, substantially as described.

13. In a counterbalanced stairway structure, the combination with supporting-hangers, of a main pivot-shaft supported in bearings on said hangers, a stairway part secured to said main pivot-shaft, a counterbalance-arm extending from one side of said stairway part and also secured to said main pivot-shaft, a weight suspended at the end of said counterbalance-arm, and a rod pivoted below said counterbalance-arm to one of the hangers, the other end of said rod engaging said weight, descent of said stairway causing the center of gravity of the weight to be shifted to shift the center of gravity of the structure from the weight side to the stairway side of the main pivot-shaft, substantially as described.

14. In a counterbalanced stairway structure, the combination with a stairway part, of a counterbalance-arm, a movable weight at the end of said arm, a main pivot-shaft adapted to rotate in fixed bearings, said shaft being rigidly secured to the side members of said stairway, and strenthening-plates secured to said pivot-shaft and to the side members of said stairway, said strengthening-plates and shaft serving to maintain the said members of the stairway in proper alinement, substantially as described.

15. In a counterbalanced stairway structure, the combination with a stairway part, of a main pivot-shaft secured to the side members thereof, fixed bearings in which said pivot-shaft may rotate, a counterbalance-arm secured to one of said stairway members and to said pivot-shaft, a movable weight at the end of said counterbalance-arm, and a strengthening-plate secured to the other member of said stairway and to said shaft, said strengthening-plate and shaft serving to maintain the stair member in alinement with the stair member to which the counterbalance-arm is secured, substantially as described.

16. In a counterbalanced stairway structure, the combination with a stairway part, of a main pivot-shaft secured to the end of said stairway, bearings in which said pivot-shaft may rotate, a counterbalance-arm secured to said stairway part, a weight at the end of said counterbalance-arm, and thrust-braces extending from said main shaft to the under side of the side members of the stairway to prevent sagging or lateral spreading of the stairway part, substantially as described.

17. In a counterbalanced stairway structure, the combination with a stairway part, of a main pivot-shaft secured to the end thereof, bearings for said pivot-shaft, a counterbalance-arm extending from said stairway part, a weight at the end of said counterbalance-arm, thrust-brace members extending from said pivot-shaft to the sides of said stairway part to prevent sagging or lateral swaying thereof, and means for adjusting the thrust in said brace members, substantially as described.

18. In a counterbalanced stairway structure, the combination of a stairway part, of a counterbalance weight-arm, a pivot-shaft for the structure extending through the side members of the stairway part and secured thereto, and fixed bearings in which said pivot-shaft rotates, substantially as described.

In witness whereof I hereunto subscribe my name this 11th day of April, A. D. 1904.

OTTO C. FOSSELMAN.

Witnesses:
CHARLES J. SCHMIDT,
LEONARD W. NOVAUDER.